(12) United States Patent
Smith

(10) Patent No.: US 6,968,325 B2
(45) Date of Patent: Nov. 22, 2005

(54) SYSTEM AND METHOD FOR AUTOMATICALLY ADJUSTING MERCHANDISE PRICING AT A SERVICE-ORIENTED INTERFACE TERMINAL BASED UPON THE QUANTITY OF USERS PRESENT AT THE TERMINAL

(75) Inventor: Gordon James Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 960 days.

(21) Appl. No.: 09/772,261

(22) Filed: Jan. 29, 2001

(65) Prior Publication Data

US 2002/0103769 A1 Aug. 1, 2002

(51) Int. Cl.$^7$ .............................................. G06F 17/60
(52) U.S. Cl. ........................ 705/400; 705/14; 705/26; 705/37; 235/381; 700/236
(58) Field of Search ............................... 705/26, 37, 14

(56) References Cited

U.S. PATENT DOCUMENTS

| | | | |
|---|---|---|---|
| 6,073,840 A * | 6/2000 | Marion | 235/381 |
| 6,601,039 B1 * | 7/2003 | Kolls | 705/14 |
| 6,778,967 B1 * | 8/2004 | Nicholson | 705/14 |
| 2001/0016825 A1 * | 8/2001 | Pugliese et al. | 705/5 |
| 2002/0007306 A1 * | 1/2002 | Granger et al. | 705/14 |
| 2002/0046117 A1 * | 4/2002 | Marion | 705/14 |
| 2003/0110063 A1 * | 6/2003 | Among et al. | 705/6 |
| 2003/0200008 A1 * | 10/2003 | Wilson | 700/236 |

FOREIGN PATENT DOCUMENTS

KR 2001016262 A * 3/2001 ............ G06F 17/60

OTHER PUBLICATIONS http://web.archive.org/web/*/http://www.autoshare.com/mediastories/globeand mail311299.html.*
Sonders, Scott, "Valley Commentary Let's Not Stall A computer-aided 90's version of hitchhiking can be a reliable, safe way of making roads less congested. The system works well in Germany", Feb., 20, 1994; Los Angeles Times, p. 25.*
"Car pooling On A Geographical Basis", Jun. 1977, New South Wales Traffic Authority, Australia, pag: 39 pp.*
Morrill, Richard, "If we're serious about our transportation mess . . . ", Thursday, Nov. 16, 2000, Seatlle Times, Second ed, p B7.*

* cited by examiner

Primary Examiner—John W. Hayes
Assistant Examiner—Freda A. Nelson
(74) Attorney, Agent, or Firm—Roy W. Truelson

(57) ABSTRACT

A business method prompts users of electronic payment cards and automatically adjusts automobile fuel pricing based upon the number of passengers in a vehicle at a refueling station. When the driver stops to refuel the vehicle, the system prompts the driver to insert a payment card to pay for the fuel. If there are other passengers in the vehicle, they too are prompted to insert their cards to indicate that they are riding with the driver. The system is provided with numerous protocols for ensuring that the system is not inappropriately circumvented. For example, the system can verify that the additional cards are not from other patrons at the same service center, or that the additional cards are not from other family members of the purchasing card holder. After all cards have been read and verified, the reduced price of the fuel is displayed and the fuel is dispensed.

9 Claims, 4 Drawing Sheets

SYSTEM AND METHOD FOR AUTOMATICALLY ADJUSTING MERCHANDISE PRICING AT A SERVICE-ORIENTED INTERFACE TERMINAL BASED UPON THE QUANTITY OF USERS PRESENT AT THE TERMINAL

BACKGROUND OF THE INVENTION

1. Technical Field

This invention relates in general to a method and system for interfacing with customers at service-oriented terminals, and in particular to a method and system for service-oriented, user interface terminals where users make purchases electronically. Even more particularly, the invention relates to a system and method for automatically adjusting merchandise pricing during a remote point of purchase action at a self-service facility.

2. Description of the Related Art

Self-service oriented, user interface terminals for making purchases electronically, such as with commercial credit cards, debit cards, SMART cards, or other types of data storage cards, are now common. These types of terminals are typically utilized wherever a basic or routine transaction can be processed more efficiently on site without the need for human intervention or judgment. Examples include fuel pumps of automotive refueling stations, automated vending machines for purchasing tickets for transportation (e.g., airline tickets), personalized greeting card vending machines, and the like. To use these terminals, users are merely required to insert or pass their data storage card through or by a reading device (thereby entering their account information into the system) and wait for approval before selecting their options. The ease and convenience of such transactions have made such terminals very popular. Some terminals and/or electronic cards also require users to enter a password or personal identification number (PIN) to ensure authorized usage of such cards.

As mentioned above, automobile refueling stations are a popular example of unattended electronic purchases at the point-of-sale. Currently, the same fuel prices are offered to all commuters/purchasers regardless of the number of occupants in their vehicle (e.g., the efficiency with which they are traveling). However, in light of the U.S. Department of Energy and the Department of Transportation's recommendations that automobile commuters car-pool in order to save energy, it would be advantageous to reward commuters who choose to car-pool. Petroleum resources are finite and within the next 30 to 50 years most petroleum resources could be nearly exhausted, or the cost of extracting oil from these resources could be prohibitive. Providing commuters with incentives to car-pool would not only conserve gasoline as a resource, but would also reduce the number of vehicles on roadways, thereby reducing pollution and traffic congestion. Thus, an improved business method for automatically adjusting merchandise pricing, such as automobile fuel, during a remote point of purchase action at a self-service facility would be desirable.

SUMMARY OF THE INVENTION

One embodiment of a business method and system for prompting users of data storage cards in order to automatically adjust merchandise pricing based upon the quantity of users present at a self-service oriented interface terminal is disclosed. Ideally, the present invention works with point-of-sale automobile fuel dispensers that accept portable data storage devices, such as credit cards. When an automobile driver stops to refuel his or her vehicle at the fuel dispenser, the driver is prompted to insert a card to pay for the fuel and/or other merchandise. If there are other adult passengers present in the vehicle, they too are prompted to insert their cards to indicate that they are commuting with the driver. In the preferred version, the passengers' cards are read only to adjust the price of the fuel based upon the number of passengers present. The passengers' cards are not charged for payment of the fuel.

The system may be provided with numerous protocols for ensuring that the system is not inappropriately used or circumvented. For example, the system can verify that additional cards read with the purchaser's card are not from other patrons at the same service center, or that the additional cards are not from other family members of the purchasing card holder. Another example includes limiting the total number of cards associated with the purchaser to not exceed the passenger capacity of the purchaser's vehicle. In yet another example, fingerprints and/or voice prints may be used to authenticate each of the passengers. After all cards have been read and verified, the reduced price of the fuel is displayed and the fuel is dispensed.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and are therefore not to be considered limiting of its scope as the invention may admit to other equally effective embodiments.

DESCRIPTION OF THE PREFERRED EMBODIMENT

The present invention may be executed in a variety of systems including computer systems having various operating systems. The computer system may be a personal computer, a network computer, a midrange computer or a mainframe computer. In addition, the computer may be a stand-alone system or part of a network such as a local-area network (LAN) or a wide-area network (WAN). For the purposes of illustration, one embodiment of the present invention, as described below, is implemented utilizing a personal computer.

Figure 1:
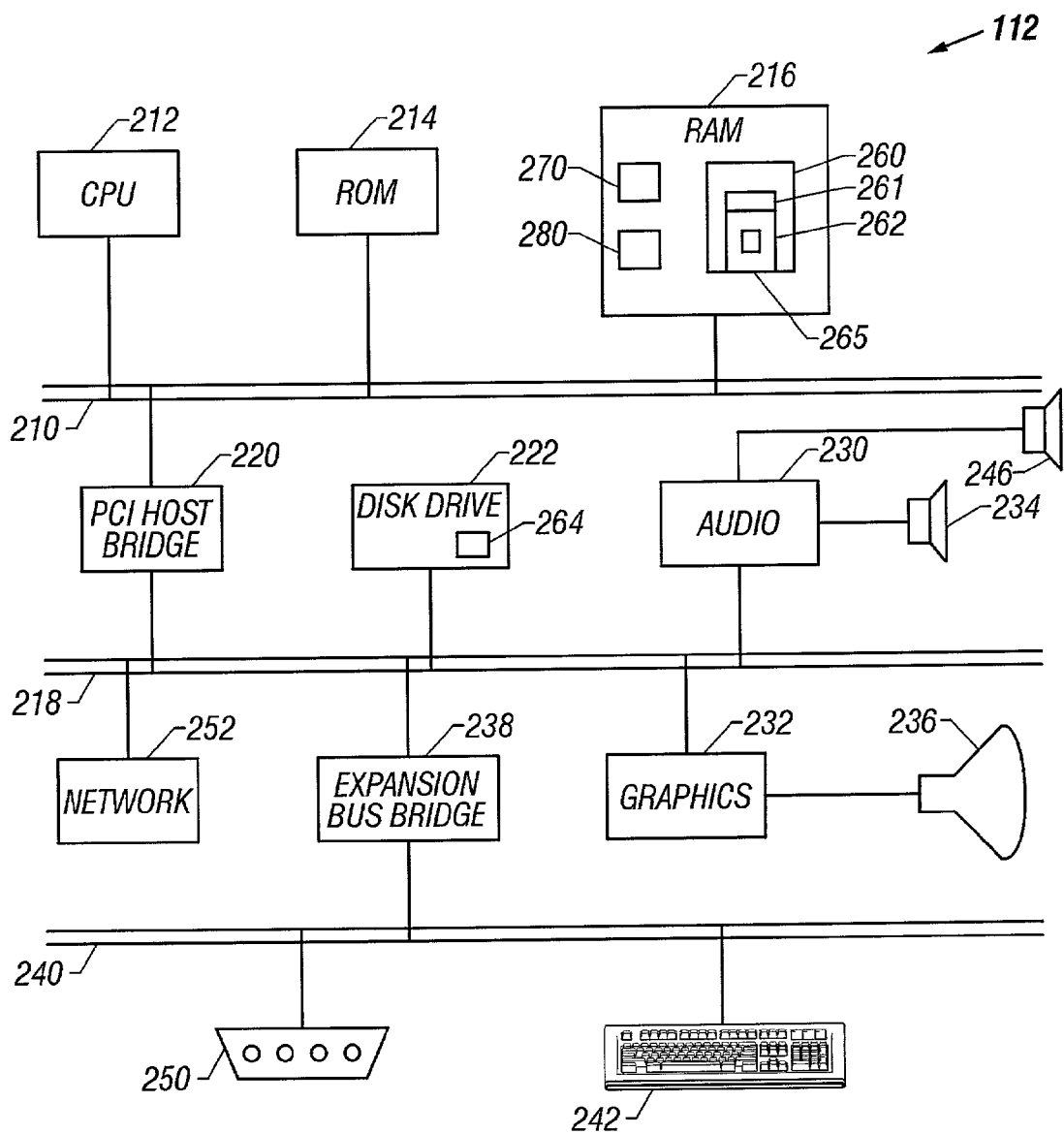
FIG. 1 depicts a schematic diagram of an illustrative embodiment of an automated refueling station interface terminal constructed in accordance with the method and system of the present invention.

Referring now to FIG. 1, there is depicted a block diagram of a server 112. Server 112 includes a system bus 210 that is connected to a central processing unit (CPU) 212 and to memory, including read only memory (ROM) 214 and random access memory (RAM) 216. System bus 210 is coupled to a PCI local bus 218 through a PCI host bridge 220. PCI local bus 218 is connected to additional nonvolatile data storage devices, such as one or more disk drives 222, and to an audio adapter 230 and a graphics adapter 232 for controlling audio output through a speaker 234 and visual output through a display device 236, respectively. A PCI-to-ISA bus bridge, such as expansion bus bridge 238, connects PCI local bus 218 to an ISA bus 240, which is attached (through appropriate adapters) to a keypad 242 for receiving operator input. A microphone of other audio input device 246 is connected to audio adapter 230.

Also included within server 112 are data ports for communicating with external equipment, such as other data processing systems. The data ports include, without limitation, a serial port 250 attached to ISA bus 240 for linking server 112 to remote data processing systems (such as a bridge) via a modem (not illustrated) and a communications adapter 252 attached to PCI bus 218 for linking server 112 to other stations of a LAN (such as clients).

Server 112 also contains software applications that are stored on the data storage devices and loaded into RAM 216 for execution by CPU 212. Among those applications is a communications program, such as communications manager 260, that manages the exchange of information between the LAN and remote data processing systems. Included in communications manager 260 is a connection initiator 261 for establishing dial-up connections to remote data processing systems. Communications manager 260 also includes Internet sharing software 262 that enables multiple LAN stations to access the Internet via a single connection. In the illustrative embodiment, server 112 also includes a connection schedule file 264, which preferably is stored in disk drive 222, and Internet sharing software 262 includes a request predictor 265 that utilizes connection schedule file 264 to trigger connection initiator 261 in advance of anticipated communication requests.

Connection schedule file 264 is maintained by a schedule editor and/or an automatic schedule modifier, each of which is preferably also included in Internet sharing software 262. Server 112 also includes a Web browser 270 and an E-mail client 280 that allow an operator of server 112 or client to retrieve and view information from the Internet and send and receive E-mail via the Internet, respectively.

Figure 2:
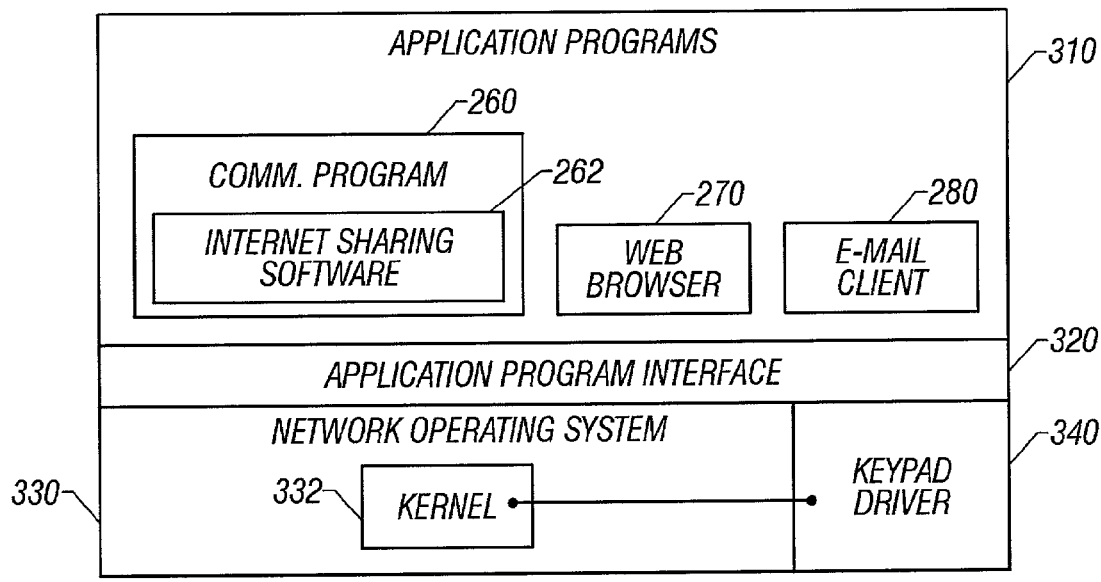
FIG. 2 is a layer diagram of programs in a data processing system of FIG. 1 that cooperate to automatically connect to a remote data processing system according to the method and system of the present invention.

With reference now to FIG. 2, there is depicted a layer diagram of the software applications within server 112 that cooperate to provide the functionality of the present invention according to the illustrative embodiment. At the highest level of the layer diagram are the software application programs 310, including communications manager 260, web browser 270, and E-mail client 280. At the intermediate level is an application program interface (API) 320, through which application programs 310 request services from the operating system 330. Operating system 330, which occupies the lowest level of the layer diagram, is a network operating system. As such, in addition to managing the operations of server 112 (by performing duties such as resource allocation, task management, and error detection), operating system 330 also provides tools for managing communications within the LAN and between LAN stations and remote data processing systems. Included within operating system 330 is a kernel 332 that manages the memory, files, and peripheral devices of server 112. The lowest level also includes device drivers, such as a keypad driver 340 that kernel 332 utilizes to manage input from and output to peripheral devices.

For purposes of illustration of the present invention, an automotive refueling station having a fuel pump equipped with a user interface terminal 81 (FIG. 3) is described. Terminal 81 includes a display screen 83 for graphically interfacing with the user, and option buttons 85 that can be selected by the user when prompted by the system.

Figure 4:
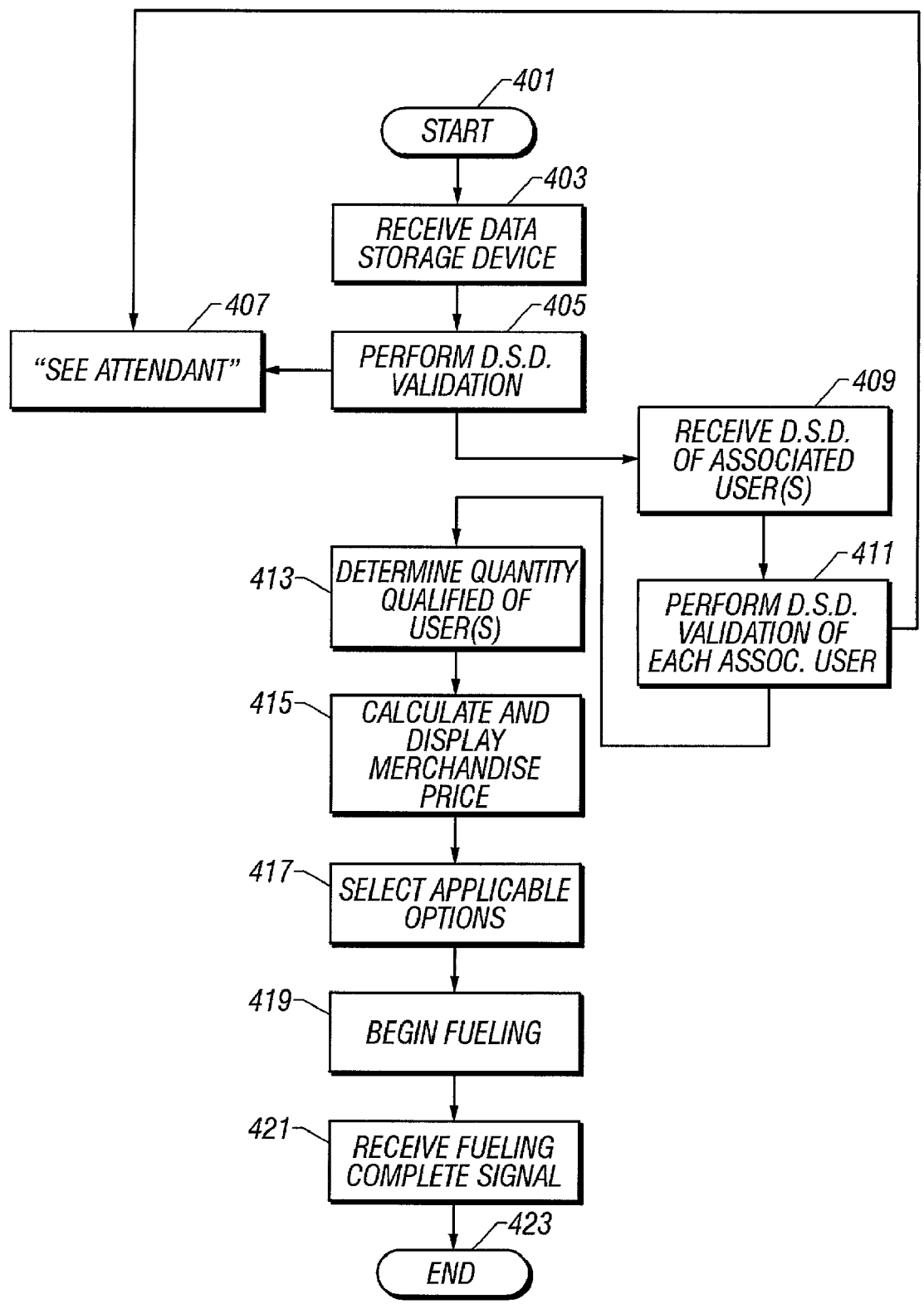
FIG. 4 is a high level, logical flowchart of an illustrative embodiment of the method and system of the present invention utilized by the automated refueling station of FIG. 1 for qualifying users of data storage devices.

Referring now to FIG. 4, there is illustrated one embodiment of a high level, logic flow diagram of a method for prompting users of data storage cards, at self-service oriented interface terminals, in order to automatically adjust merchandise pricing based upon the quantity of users present at the terminal. In the preferred embodiment, commuters who are car-pooling with other passengers in the same vehicle are given a discount on their fuel purchases as an incentive and/or reward for car-pooling. Note that the present invention is capable of tracking the selections of data storage device users across multiple interface terminals at the same station if they use devices with different account numbers. Alternatively, the present invention is also adapted to track the selections of data storage device users at different stations, or any combination of these scenarios.

Figure 3:
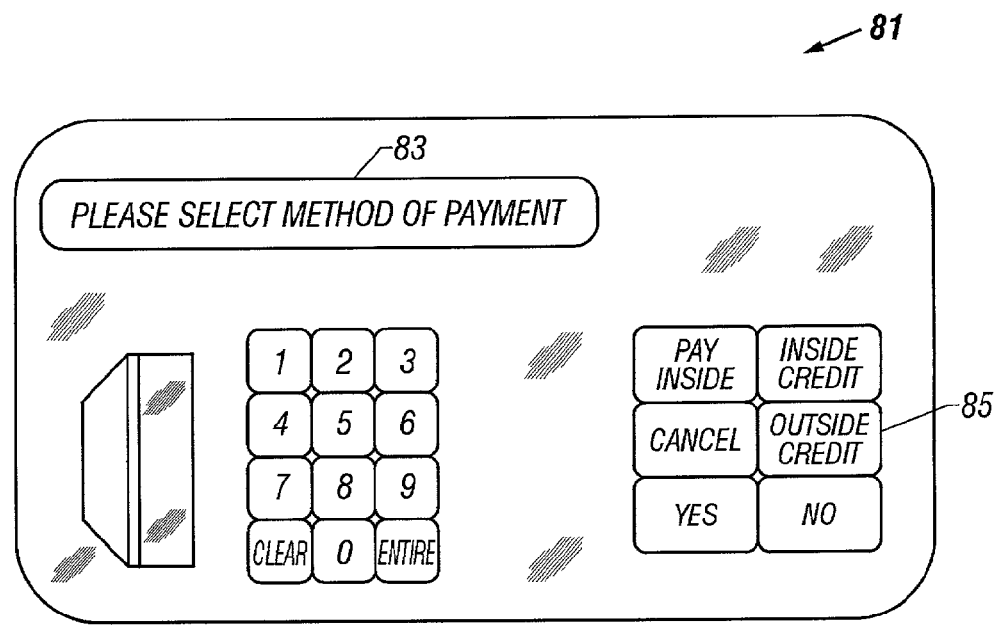
FIG. 3 is a schematic diagram of an optional user interface terminal for the data processing system of FIG. 1.

In one embodiment of the present invention, an automobile refueling station is equipped with a remote terminal 81 of FIG. 3, and the algorithm begins as illustrated at block 401 (FIG. 4). A credit card, debit card, SMART card, or other data storage device for purchasing fuel at a refueling station is inserted, scanned, or read at a point-of-sale fuel dispensing station, as shown in block 403. Preferably, the fuel and/or other merchandise purchase is charged to the holder of the card received in block 403 (typically but not necessarily the driver of the vehicle), but this is not a requirement. The card may be utilized in any one of a number of reading devices, including electronic, magnetic, optical, and/or other means. As depicted in block 405, a determination is then made as to whether the card is valid, and/or whether a line of credit or debit is authorized by the issuer of the card. If the card is not validated and/or authorized, the process proceeds, for example, to block 407. Block 407 illustrates displaying a message within display screen 83 such as "See attendant," "Authorization denied," or a similar message for conveying to the purchaser/user that an alternate means of payment is required.

If the card is authorized, the process proceeds to block 409. Block 409 depicts the inquiry as to whether there are any other passengers or commuters associated with the initial card holder. If there are other passengers commuting within the same vehicle and they have a card or data storage device issued to them, each of them must be acknowledged by the system. The system will prompt the purchaser and/or passengers (e.g., collectively referred to as the users or passengers) for additional passengers until the users decline, or a specified time period elapses. Alternatively, the system initially may prompt the purchaser for a specific number of passengers (e.g., four passengers) and then sequentially request the card of each of the four passengers. Any of the users may enter the cards. However, as illustrated at block 411, the system may verify the purchaser and each user by requesting some form of password or personal identification code with each card, particularly if fraudulent use is suspected. The system then determines the total number of qualified users, as depicted at block 413.

As illustrated at block 415, the price of the fuel is automatically adjusted based on the total number of users. For example, if the purchasing card holder is commuting alone with no other passengers, the highest price for the fuel (e.g., an initial or nominal price) will apply to the current purchase. However, if the purchasing card holder is commuting with one other card-carrying passenger, the price of the fuel for the current purchase will be decreased below that of the nominal price. Moreover, if the purchasing card holder is commuting with two or more other card-carrying passengers, the price of the fuel for the current purchase will be decreased even further in proportion to the total number of card-carrying users or passengers.

After the total number of vehicle occupants is ascertained, the process proceeds to block 417 wherein the purchaser (or other user) enters his or her current selection of options. Alternatively, this step may be offered and performed immediately after the initial card is read, before the other users are prompted to have their cards read. For example, the purchaser may select a type and/or grade of fuel, whether a receipt for the purchase is desired, and whether a car wash would like to be purchased. The price for the fuel (e.g., the price per gallon) is based upon the total number of users and, preferably, is inversely related thereto. The fuel price is calculated and displayed after all cards have been verified, as depicted at block 415. After the price is displayed and any applicable options have been selected, the process proceeds to block 419. Block 419 illustrates displaying a "Begin fueling" message, wherein the purchaser is allowed to begin fueling the vehicle. Block 421 illustrates a determination of whether a "fueling complete" signal has been received by the process. When the user has completed the fueling of his or her vehicle, the fueling complete signal is received by the process, and the process exits as illustrated at block 423.

The method and system is provided with numerous protocols for ensuring that the system is not inappropriately used or circumvented. The system is able to verify that the passengers are indeed associated with and passengers of the same vehicle as the purchaser. For example, the system can audit the facility at multiple ones of the terminals to verify that additional cards read and associated with the purchaser's card are not from other patrons at the same service center (e.g., drivers and/or passengers of other vehicles), such that the fuel price offered to the purchaser is an appropriate price (i.e., either the normal price or a discounted price). The system can also verify and confirm that the additional cards are not from other family members of the purchasing card holder (if this restriction is required).

Figure 5:
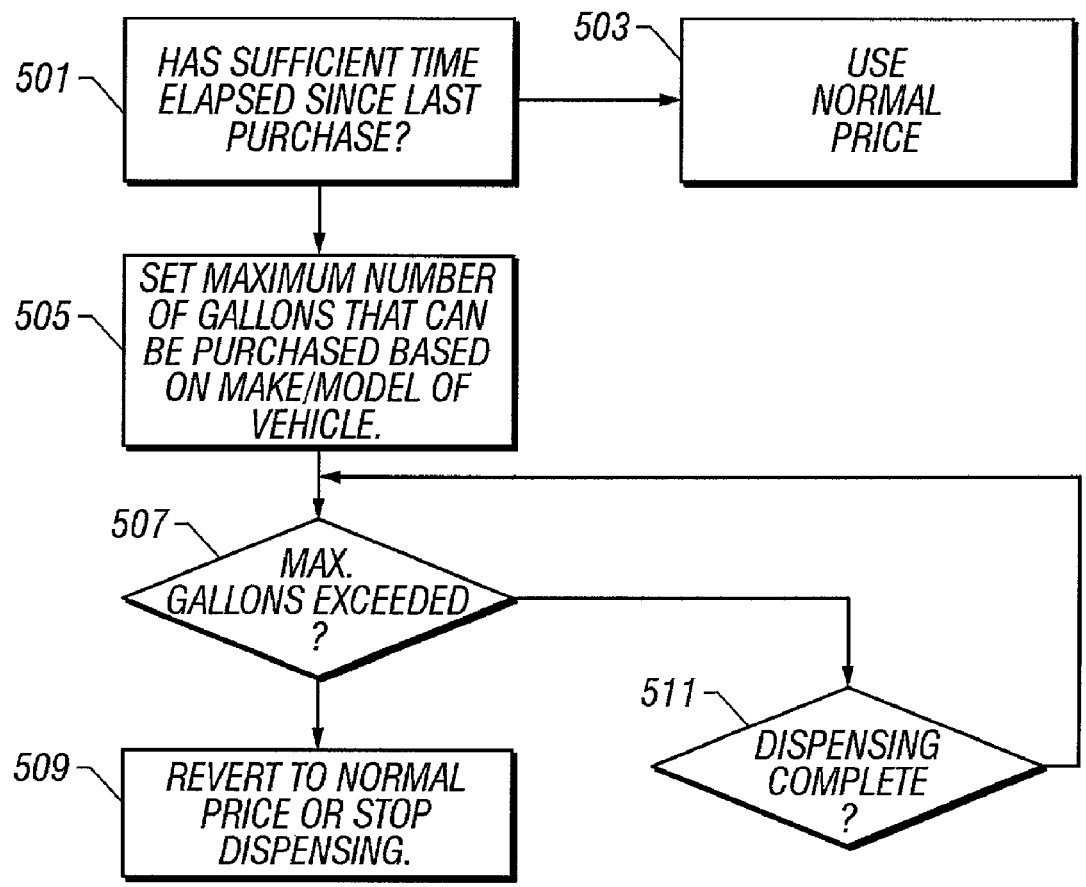
FIG. 5 is a block diagram illustrating an illustrative embodiment of the details of block 413 of FIG. 4.

FIG. 5 depicts yet another protocol of the present invention that may be used during the method and system of FIG. 4. As illustrated at block 501, the system makes a determination to see if sufficient time has elapsed since the last refueling event. If, according to time-keeping records, an inadequate amount of time has passed since the last time the card was used to purchase fuel, the method proceeds to block 503, wherein the normal (undiscounted) fuel price is offered to the consumer. This protocol reduces the probability that, for example, the refueling hose will be passed from vehicle to vehicle in order to obtain a large quantity of discounted fuel. However, if an adequate amount of time has passed since the last time the card was used to purchase fuel, the method proceeds to block 505, wherein a maximum quantity of fuel that may be purchased is set based upon the vehicle make and/or model of the card holder, for example.

During refueling, the system monitors the amount of fuel dispensed, as illustrated at block 507. If the maximum amount of fuel allowed during the present purchase is met or exceeded, the system may offer several options to the user. As depicted at block 509, the system may automatically revert to the normally-priced fuel price for the additional gallons. Alternatively, the system may prompt the user to make a selection, such as to terminate fueling, pay the higher fuel price, provide additional validation, to see the attendant, etc. If the maximum amount of fuel allowed during the present purchase is not exceeded (illustrated at block 511), the system monitors the pump to make a determination if refueling is complete. The sequence of steps illustrated in FIG. 5 may be implemented, for example, during the steps depicted at block 413 of FIG. 4.

Another example includes limiting the total number of cards associated with the purchaser to not exceed the passenger capacity of the purchaser's vehicle. After all cards have been read and verified, the reduced price of the fuel is displayed and the fuel is dispensed. If an inconsistency is present or fraudulent activity is suspected, the system may return to block 407, which depicts prompting the user to "See attendant" or the like to verify the alleged number of commuters. Alternatively, the system may simply default to the fuel price for vehicles occupied by a single user (e.g., only a driver).

The present invention has several advantages. The business method and system motivates and rewards car-pooling commuters that carry electronic payment cards by automatically lowering fuel prices based upon the number of card-carrying passengers in the vehicle. This method is consistent with the U.S. Department of Energy and the Department of Transportation's recommendations that automobile commuters car-pool in order to save energy. Providing commuters with incentives to car-pool conserves gasoline as a resource and reduces the number of vehicles on roadways, thereby reducing pollution and traffic congestion.

It is also important to note that, although the present invention has been described in the context of a fully functional computer system, those skilled in the art will appreciate that the mechanisms of the present invention are capable of being distributed as a program product in a variety of forms, and that the present invention applies equally regardless of the particular type of signal-bearing media utilized to actually carry out the distribution. Examples of signal-bearing media include, but are not limited to, recordable-type media such as floppy disks or CD-ROMs and transmission-type media such as analogue or digital communications links. In addition, it should be apparent that the present invention may be employed with alternate means of human personal identification systems, including but not limited to fingerprint identification systems and voice or voiceprint identification systems.

What is claimed is:

1. A computer implemented method of automatically pricing fuel during a remote point of purchase action at a refueling facility, said method comprising the steps of:
(a) receiving a purchase option selection from a purchaser, said selection including a first fuel price, during a transaction at the refueling facility, said purchase option selection being received at a terminal of a computer-controlled fuel dispensing device of said refueling facility;
(b) receiving an indication of any passengers accompanying the purchaser in a vehicle;
(c) automatically calculating a second fuel price based upon a quantity of said any passengers indicated in step (b), wherein the second fuel price is lower than the first fuel price when there is at least one passenger accompanying the purchaser, said automatically calculating step being performed by a computer controlling said computer-controlled fuel dispensing device;

(d) responsive to step (c) permitting the purchaser to purchase fuel at the second fuel price from said computer-controlled fuel dispensing device; and (e) wherein steps (a) and (b) require the purchaser and each of said any passengers to enter information with a data storage device.

2. The method of claim 1 wherein step (a) requires the purchaser to enter information with a data storage device.

3. The method of claim 1 wherein step (c) comprises inversely relating the second fuel price to the quantity of said any passengers.

4. The method of claim 1, further comprising the step of verifying each of the purchaser and said any passengers with a personal identification code.

5. The method of claim 1, further comprising the step of auditing the refueling facility to confirm that the second fuel price is an appropriate price.

6. A computer implemented method of automatically pricing fuel during a remote point of purchase action at a refueling facility, said method comprising the steps of:

(a) receiving information at a terminal of a computer-controlled fuel dispensing device at the refueling facility from a personal data storage device issued to a purchaser;

(b) receiving a purchase option selection from the purchaser, said selection including a first fuel price, said selection being received at said terminal;

(c) receiving information with respect to any passengers accompanying the purchaser in a vehicle at the terminal from a respective personal data storage device issued to each of the passengers;

(d) automatically calculating a second fuel price based upon a quantity of total passengers indicated by step (c), wherein the second fuel price is lower than the first fuel price when there is at least one passenger accompanying the purchaser, said automatically calculating step being performed by a computer controlling said computer-controlled fuel dispensing device; and (e) responsive to step (d), permitting the purchaser to purchase fuel at the second fuel price from said computer-controlled fuel dispensing device.

7. The method of claim 6 wherein step (d) comprises inversely relating the second fuel price to the quantity of total passengers.

8. The method of claim 6, further comprising the step of verifying each of the purchaser and said any passengers with a personal identification code.

9. The method of claim 6, further comprising the step of auditing the refueling facility to confirm that the second fuel price is an appropriate price.

* * * * *

Disclaimer 6,968,325 B2 — Gordon James Smith, Rochester, MN (US). SYSTEM AND METHOD FOR AUTOMATICALLY ADJUSTING MERCHANDISE PRICING AT A SERVICE-ORIENTED INTERFACE TERMINAL BASED UPON THE QUANTITY OF USERS PRESENT AT THE TERMINAL. Patent dated November 22, 2005. Disclaimer filed October 6, 2006, by the assignee, International Business Machines Corporation.

Hereby enters this disclaimer to claims 1-9, of said patent.

(*Official Gazette October 14, 2008*)